(12) United States Patent
Donegan et al.

(10) Patent No.: US 12,487,408 B2
(45) Date of Patent: Dec. 2, 2025

(54) REFERENCE MARKERS ADJACENT TO A CAVITY IN A PHOTONICS CHIP

(71) Applicant: GlobalFoundries U.S. Inc., Malta, NY (US)

(72) Inventors: Keith Donegan, Saratoga Springs, NY (US); Thomas Houghton, Marlboro, NY (US); Yusheng Bian, Ballston Lake, NY (US); Karen Nummy, Newburgh, NY (US); Kevin Dezfulian, Arlington, VA (US); Takako Hirokawa, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 276 days.

(21) Appl. No.: 18/139,128

(22) Filed: Apr. 25, 2023

(65) Prior Publication Data

US 2024/0361529 A1    Oct. 31, 2024

(51) Int. Cl.
*G02B 6/30* (2006.01)
*G02B 6/42* (2006.01)

(52) U.S. Cl.
CPC .............. *G02B 6/305* (2013.01); *G02B 6/42* (2013.01); *G02B 6/4206* (2013.01)

(58) Field of Classification Search
CPC .......... G02B 6/42; G02B 6/4201; G02B 6/30; G02B 6/136; G02B 6/305; G02B 6/4206
See application file for complete search history.

(56) References Cited

U.S. PATENT DOCUMENTS

| | | | |
|---|---|---|---|
| 11,156,789 B2 | 10/2021 | Mahgerefteh et al. |
| 11,404,404 B2 | 8/2022 | Chen et al. |
| 11,644,695 B2 | 5/2023 | Bian |
| 11,860,414 B2 | 1/2024 | Barwicz et al. |

(Continued)

FOREIGN PATENT DOCUMENTS

| | | |
|---|---|---|
| CN | 114442224 A | 5/2022 |
| CN | 114690310 A | 7/2022 |

(Continued)

OTHER PUBLICATIONS

European Patent Office, Extended European Search Report and Opinion issued in European Patent Application No. 23199991.3 on Mar. 5, 2024; 10 pages.

(Continued)

*Primary Examiner* — Michael P Mooney
(74) *Attorney, Agent, or Firm* — Thompson Hine LLP; Anthony Canale

(57) ABSTRACT

Structures including a cavity adjacent to an edge coupler and methods of forming such structures. The structure comprises a semiconductor substrate including a cavity with a sidewall, a dielectric layer on the semiconductor substrate, and an edge coupler on the dielectric layer. The structure further comprises a fill region including a plurality of fill features adjacent to the edge coupler. The fill region includes a reference marker at least partially surrounded by the plurality of fill features, and the reference marker has a perimeter that surrounds a surface area of the dielectric layer, and the surface area overlaps with a portion of the sidewall of the cavity.

20 Claims, 6 Drawing Sheets

(56) References Cited

U.S. PATENT DOCUMENTS

2022/0206220 A1    6/2022   Barwicz et al.

FOREIGN PATENT DOCUMENTS

EP           4455746 A1 * 10/2024   ............. G02B 6/136
WO        2021209139 A1    10/2021

OTHER PUBLICATIONS

Taiwan Intellectual Property Office, Office Action and Search Report issued in Taiwanese Patent Application No. 113111074 on Dec. 27, 2024; 16 pages.
S. Bernabé et al., "In-plane pigtailing of silicon photonics device using "semi-passive" strategies," 2012 4th Electronic System-Integration Technology Conference, Amsterdam, Netherlands, 2012, pp. 1-6, doi: 10.1109/ESTC.2012.6542171.
Mu, Xin, Sailong Wu, Lirong Cheng, and H.Y. Fu. 2020. "Edge Couplers in Silicon Photonic Integrated Circuits: A Review" Applied Sciences 10, No. 4: 1538. https://doi.org/10.3390/app10041538.
A. Aboketaf et al., "Towards fully automated testing and characterization for photonic compact modeling on 300-mm wafer platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper W6A.1.
K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, doi: 10.1109/JSTQE.2019.2908790.
M. Rakowski et al., "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group, 2020), paper T3H.3.
B. Peng et al., "A CMOS Compatible Monolithic Fiber Attach Solution with Reliable Performance and Self-alignment," in Optical Fiber Communication Conference (OFC) 2020, OSA Technical Digest (Optica Publishing Group, 2020), paper Th3I.4.
Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group, 2020), paper FW5D.2.
Y. Bian et al., "Hybrid III-V laser integration on a monolithic silicon photonic platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper M5A.2.
Y. Bian et al., "3D Integrated Laser Attach Technology on 300-mm Monolithic Silicon Photonics Platform," 2020 IEEE Photonics Conference (IPC), 2020, pp. 1-2, doi: 10.1109/IPC47351.2020.9252280.
Y. Bian et al., "Monolithically integrated silicon nitride platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper Th1A.46.
Y. Bian et al., "3D silicon photonic interconnects and integrated circuits based on phase matching," 2021 IEEE 71st Electronic Components and Technology Conference (ECTC), 2021, pp. 2279-2284, doi: 10.1109/ECTC32696.2021.00357.
Y. Bian et al., "Light manipulation in a monolithic silicon photonics platform leveraging 3D coupling and decoupling, " in Frontiers in Optics / Laser Science, B. Lee, C. Mazzali, K. Corwin, and R. Jason Jones, eds., OSA Technical Digest (Optica Publishing Group, 2020), paper FTu6E.3.
Korean Intellectual Property Office, Notice of Preliminary Rejection issued in Korean Patent Application No. 10-2024-0047078 on Aug. 14, 2025; 10 pages.

* cited by examiner

REFERENCE MARKERS ADJACENT TO A CAVITY IN A PHOTONICS CHIP

BACKGROUND

The disclosure relates to photonics chips and, more specifically, to structures including a cavity adjacent to an edge coupler and methods of forming such structures.

Photonics chips are used in many applications and systems including, but not limited to, data communication systems and data computation systems. A photonics chip includes a photonic integrated circuit comprised of optical components, such as modulators, polarizers, and optical couplers, that are used to manipulate light received from a light source, such as a laser or an optical fiber.

An external light source, such as a laser or an optical fiber, may be attached or coupled by an edge coupler, also known as a spot-size converter, to a photonics chip. The edge coupler couples light of a given mode from the light source to other optical components on the photonics chip. The light source may be attached inside a cavity formed in the substrate of the photonics chip. The edge coupler may include a waveguide core that defines an inverse taper having a tip that is positioned adjacent to an edge of the cavity. The gradually-varying cross-sectional area of the inverse taper supports mode transformation and mode size variation associated with mode conversion when light is transferred from the light source to the edge coupler.

The dimensions of the cavity are difficult to measure using metrology tools. In particular, the width dimension of the cavity proximate to the tip of the inverse taper may be difficult to measure because, among other reasons, the cavity may be buried beneath a thickness of several microns of dielectric material. An inability to precisely measure cavity dimensions may lead to misalignment between the edge coupler and the output of the light source that is placed in the cavity.

Improved structures including a cavity adjacent to an edge coupler and methods of forming such structures are needed.

SUMMARY

In an embodiment of the invention, a structure comprises a semiconductor substrate including a cavity with a sidewall, a dielectric layer on the semiconductor substrate, and an edge coupler on the dielectric layer. The structure further comprises a fill region including a plurality of fill features adjacent to the edge coupler. The fill region includes a reference marker at least partially surrounded by the plurality of fill features, the reference marker has a perimeter that surrounds a surface area of the dielectric layer, and the surface area overlaps with a portion of the sidewall of the cavity.

In an embodiment of the invention, a method comprises forming a cavity in a semiconductor substrate. The cavity includes a sidewall, and a dielectric layer is positioned on the semiconductor substrate. The method further comprises forming an edge coupler on the dielectric layer, and forming a fill region including a plurality of fill features adjacent to the edge coupler and the cavity. The fill region includes a reference marker at least partially surrounded by the plurality of fill features, the reference marker has a perimeter that surrounds a surface area of the dielectric layer, and the surface area overlaps with a portion of the sidewall of the cavity.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
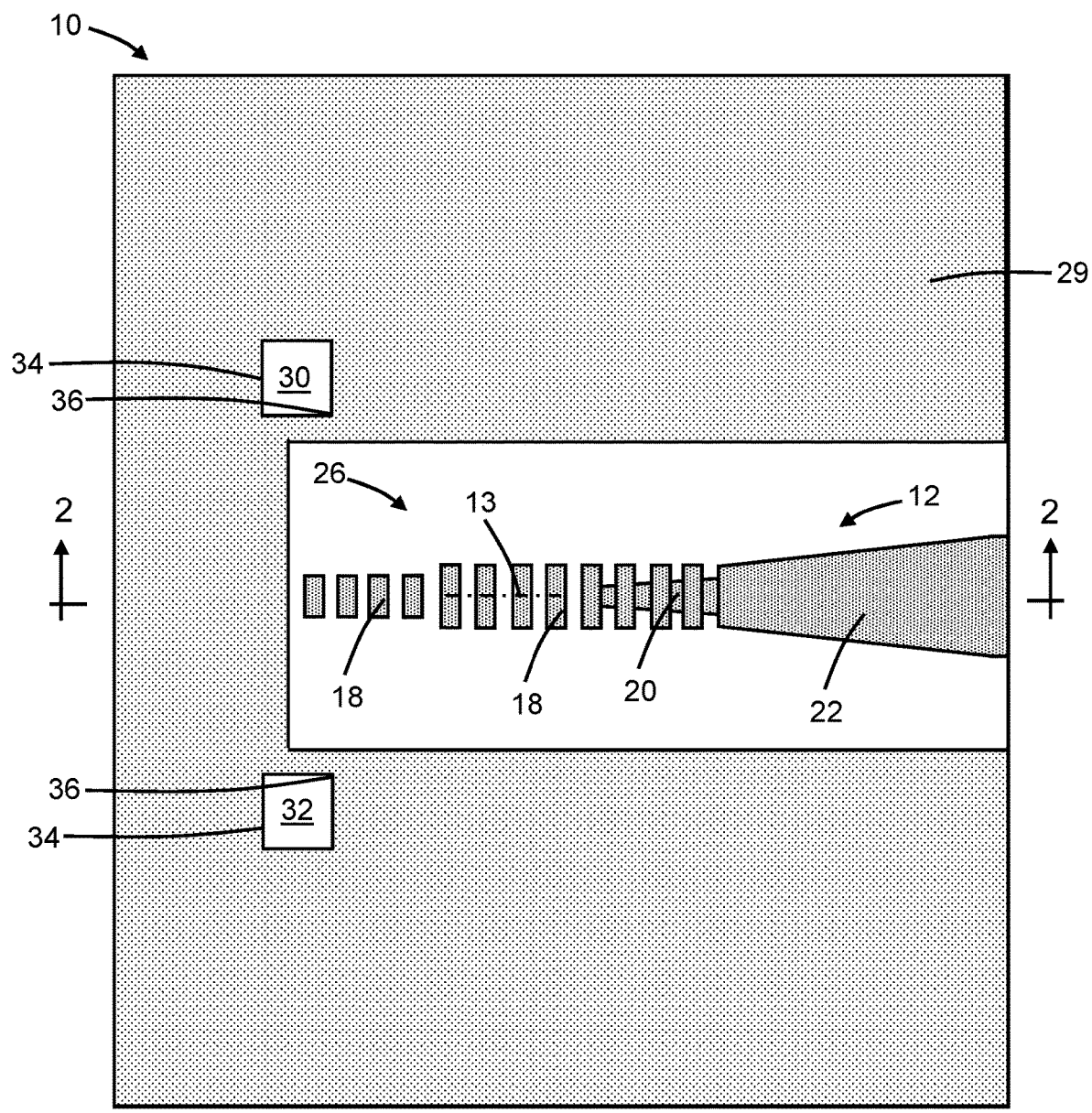
FIG. 1 is a top view of a structure at an initial fabrication stage of a processing method in accordance with embodiments of the invention.
Figure 2:
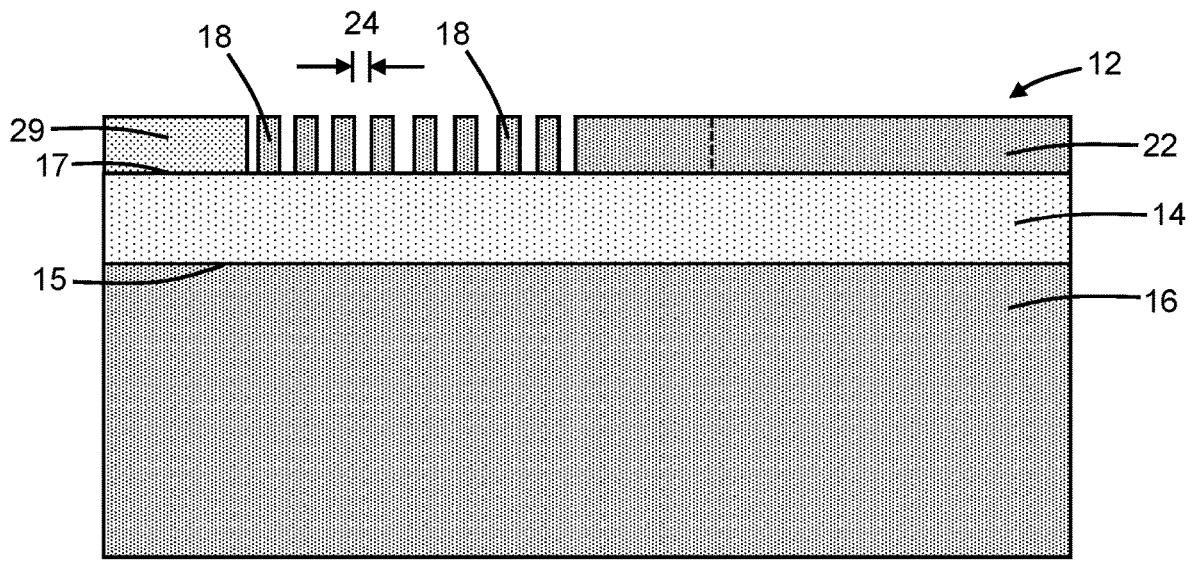
FIG. 2 is a cross-sectional view taken generally along line 2-2 in FIG. 1.
Figure 2A:
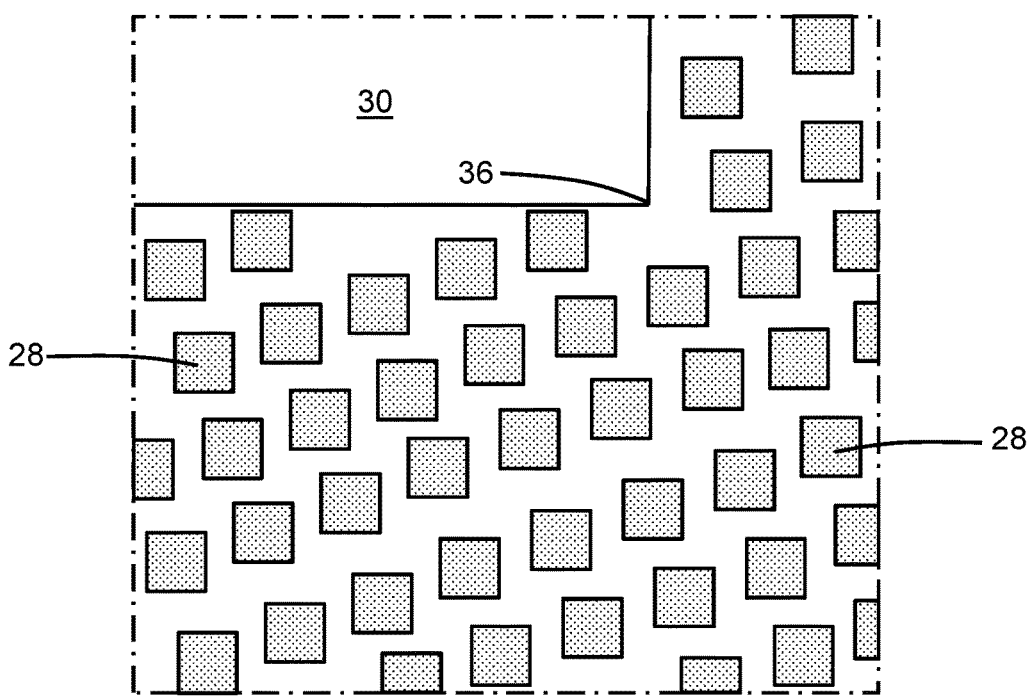
FIG. 2A is an enlarged view of a portion of FIG. 2 in which a corner of a reference marker and fill structures adjacent to the corner of the reference marker are shown.

With reference to FIGS. 1, 2, 2A and in accordance with embodiments of the invention, a structure 10 includes a waveguide core 12 that is positioned on, and over, a dielectric layer 14 and a semiconductor substrate 16. In an embodiment, the dielectric layer 14 may be comprised of a dielectric material, such as silicon dioxide, and the semiconductor substrate 16 may be comprised of a semiconductor material, such as single-crystal silicon. In an embodiment, the dielectric layer 14 may be a buried oxide layer of a silicon-on-insulator substrate, and the dielectric layer 14 may fully separate the waveguide core 12 from the semiconductor substrate 16. The waveguide core 12 is separated from the semiconductor substrate 16 by the dielectric material of the intervening dielectric layer 14, which operates as cladding. The dielectric layer 14 adjoins the semiconductor substrate 16 at an interface 15, and the dielectric layer 14 has an upper surface 17 on which the waveguide core 12 is positioned. In an alternative embodiment, one or more additional dielectric layers comprised of, for example, silicon dioxide may be positioned between the waveguide core 12 and the dielectric layer 14.

In an embodiment, the waveguide core 12 may be comprised of a material having a refractive index that is greater than the refractive index of silicon dioxide. In an embodiment, the waveguide core 12 may be comprised of a semiconductor material, such as single-crystal silicon, amorphous silicon, or polysilicon. In an alternative embodiment, the waveguide core 12 may be comprised of a dielectric material, such as silicon nitride, silicon oxynitride, or aluminum nitride.

In an embodiment, the waveguide core 12 may be formed by patterning a layer with lithography and etching processes. In an embodiment, an etch mask may be formed by a lithography process over the layer, and unmasked sections of the layer may be etched and removed with an etching process. The masked sections of the layer may determine the patterned shape of the waveguide core 12. In an embodiment, the waveguide core 12 may be formed by patterning the semiconductor material (e.g., single-crystal silicon) of the device layer of a silicon-on-insulator substrate. In an embodiment, the waveguide core 12 may be formed by patterning a deposited layer comprised of the material (e.g., silicon nitride). In an alternative embodiment, a slab layer may be connected to a lower portion of the waveguide core 12. The slab layer may be formed when the waveguide core 12 is patterned, and the slab layer, which is positioned on the dielectric layer 14, may have a thickness that is less than the thickness of the waveguide core 12.

The waveguide core 12 may include segments 18, a rib 20 that overlaps with some of the segments 18, and a section 22 that is positioned adjacent to the segments 18 and rib 20. The segments 18, rib 20, and section 22 may be arranged along a longitudinal axis 13 of the waveguide core 12. In an embodiment, the waveguide core 12 may have an end that is terminated by one of the segments 18. In an embodiment, the section 22 of the waveguide core 12 may be an inverse taper that widens with increasing distance from the segments 18. Adjacent pairs of the segments 18 are separated by gaps 24 having a given dimension in a direction parallel to the longitudinal axis 13. The segments 18 may be dimensioned and positioned at small enough pitch so as to define a sub-wavelength grating that does not radiate or reflect light at a wavelength of operation, such as a wavelength in a range of 400 nm to 3000 nm. The section 22 of the waveguide core 12 may be connected to a photonic integrated circuit on the photonics chip.

The segments 18, rib 20, and section 22 of the waveguide core 12 may define an edge coupler 26 of a photonics chip. In alternative embodiments, the edge coupler 26 may have a different configuration. For example, the segments 18 and rib 20 of the waveguide core 12 may be replaced by a solid inverse taper characterized by one or more taper angles. As another example, waveguide cores may be added to define a multiple-tip edge coupler.

As best shown in FIGS. 1 and 2A, fill features 28 may be formed by front-end-of-line processing in a fill region 29 of the layout adjacent to the waveguide core 12. The fill features 28 define tiles or fill cells that occupy a portion of the surface area of the dielectric layer 14 in the vicinity of the waveguide core 12. The fill features 28 may be absent in an exclusion zone immediately adjacent to the waveguide core 12. The fill features 28 are not required for the proper functioning of the edge coupler 26, and the fill features 28 may be placed in the layout such that the functioning of the edge coupler 26 is unaffected. The fill features 28 may, for example, assist with patterning of the waveguide core 12.

In an embodiment, the fill features 28 may be comprised of the same material as the waveguide core 12. In an embodiment, the fill features 28 may be comprised of a different material from the waveguide core 12. In an embodiment, the fill features 28 may be comprised of a semiconductor material. In an embodiment, the fill features 28 may be comprised of single-crystal silicon. In an embodiment, the fill features 28 may be comprised of polysilicon or amorphous silicon. In an embodiment, the fill features 28 may be comprised of a dielectric material, such as silicon nitride. In an alternative embodiment, the fill features 28 may be connected by a slab layer that is thinner than the fill features 28. The fill features 28 may be polygonal (e.g., square or rectangular), round, elliptical, or a combination of these shapes, and may be formed with a pattern. In an embodiment, the fill features 28 may be squares having sides that are 400 nanometers long.

The fill features 28 may be formed as printed shapes in the fill region 29 by lithography and etching processes. In an embodiment, the fill features 28 may be formed by patterning a layer of their constituent material with lithography and etching processes. In an embodiment, the fill features 28 and the waveguide core 12 may be concurrently patterned from the same layer and using the same mask. The fill features 28 are placed within the fill region 29 consistent with the manufacturing specification for at least the portion of the layout of the photonics chip including the edge coupler 26. For example, the fill features 28 may be formed with a given feature density represented by the area covered by the fill features 28 divided by the area of the fill region 29.

The fill region 29 may include reference markers 30, 32 that define windows as exclusion areas in which the fill features 28 are missing or absent. In an embodiment, the reference markers 30, 32 may represent areas within the fill region 29 in which the fill features 28 are not formed during patterning. Each of the reference markers 30, 32 may be surrounded by a perimeter 34 defining an outer edge of the areas enclosed by the reference markers 30, 32. In an embodiment, the fill features 28 may be completely absent inside the respective perimeters 34 of the reference markers 30, 32. In an embodiment, the dielectric layer 14 may have surface areas that are fully exposed by the windows inside the respective perimeters 34 of the reference markers 30, 32. In an embodiment, the fill features 28 may be positioned to fully surround the respective perimeters 34 of the reference markers 30, 32.

In an embodiment, the respective perimeters 34 of the reference markers 30, 32 may be polygonal (e.g., squares or rectangular), round, elliptical, or a combination of shapes. The edge coupler 26 is positioned in a lateral direction between the reference marker 30 and the reference marker 32. In an embodiment, a distance from the segment 18 terminating the edge coupler 26 to the reference marker 30 may be equal to the distance from the segment 18 terminating the edge coupler 26 to the reference marker 32 such that the edge coupler 26 is symmetrically positioned between the reference marker 30 and the reference marker 32. Each of the reference markers 30, 32 may include interior corners 36 that are arranged about their respective perimeters 34. In an embodiment, the interior corners 36 may be right-angle interior corners. In an embodiment, the reference markers 30, 32 may have dimensions that are significantly larger than the dimensions of the fill features 28. In an embodiment, the reference markers 30, 32 may enclose equal areas inside their respective perimeters 34.

Figure 3:
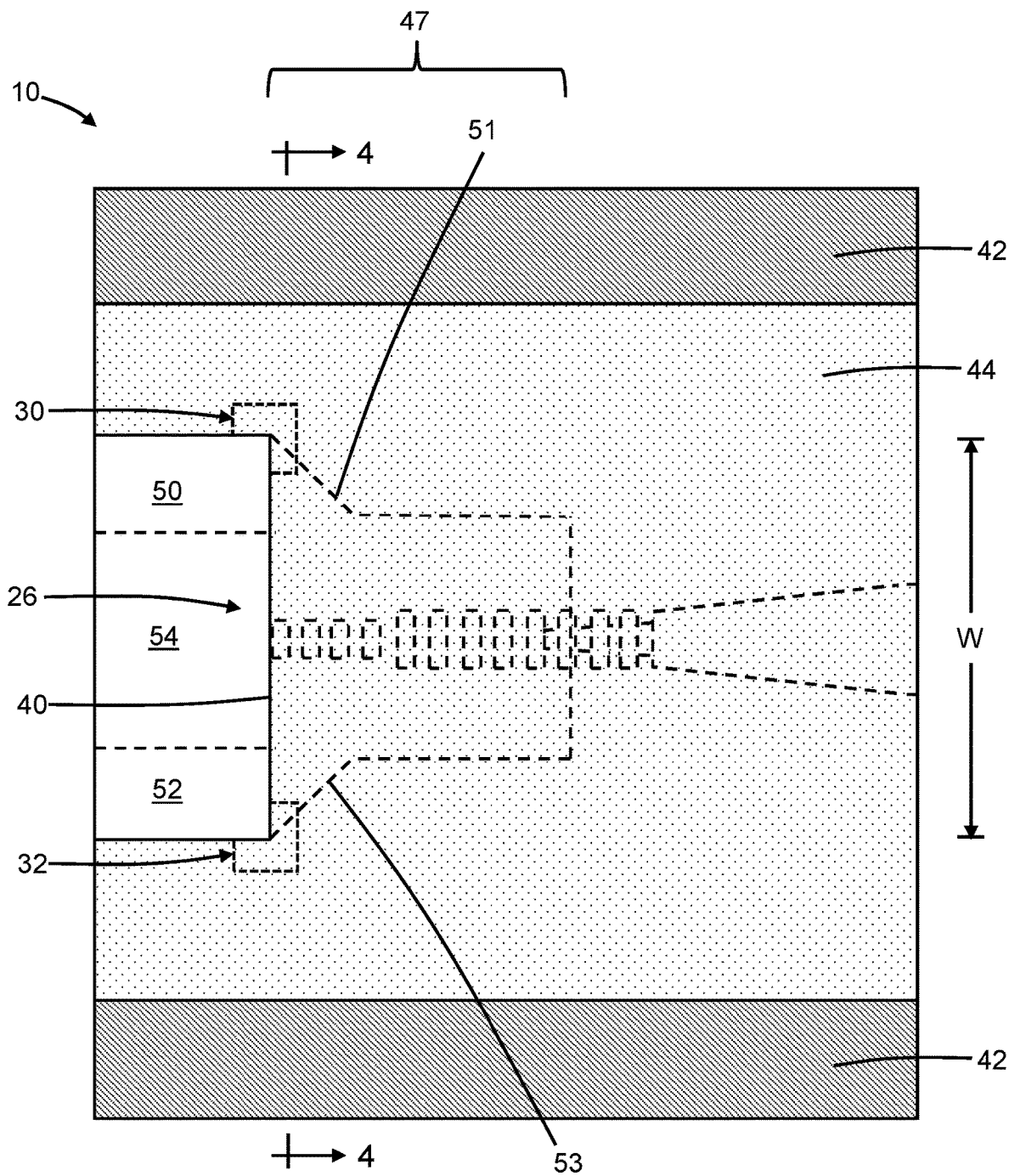
FIG. 3 is a top view of the structure at a fabrication stage of the processing method subsequent to FIGS. 1, 2.
Figure 4:
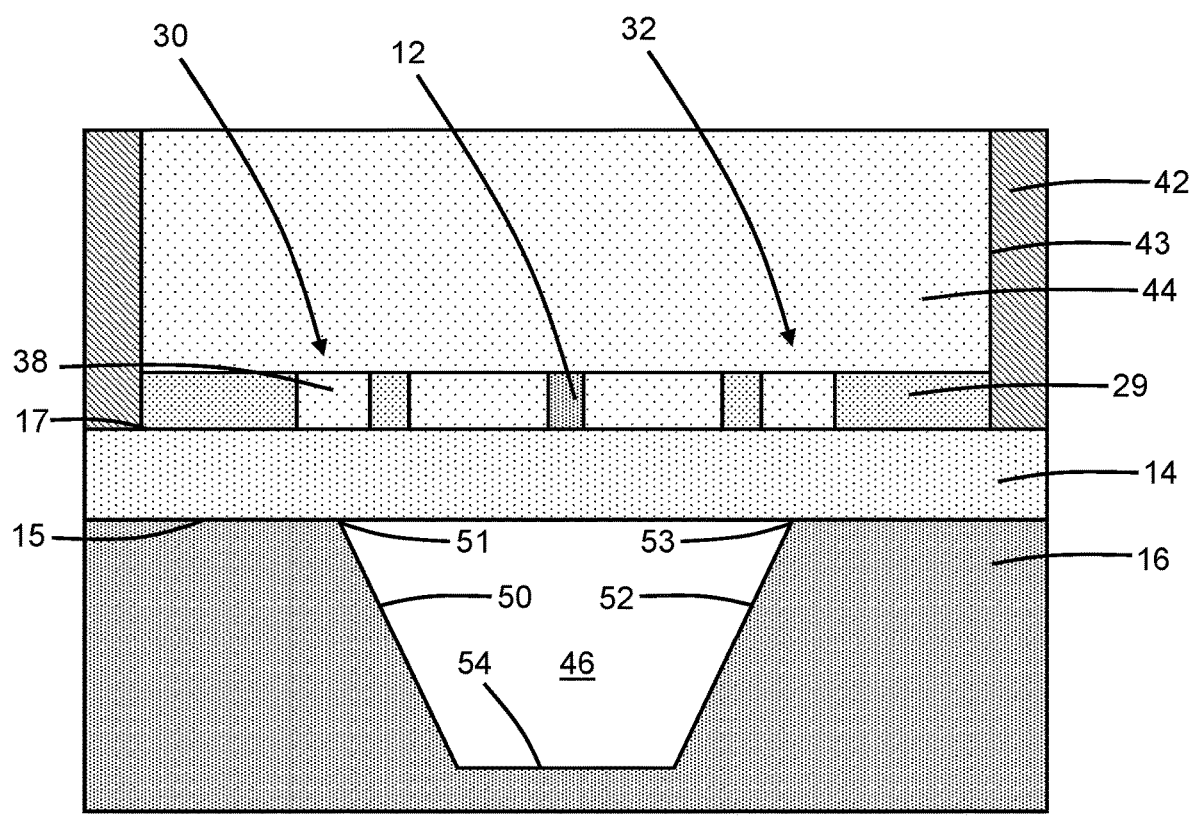
FIG. 4 is a cross-sectional view taken generally along line 4-4 in FIG. 3.

With reference to FIGS. 3, 4 in which like reference numerals refer to like features in FIGS. 1, 2, 2A and at a subsequent fabrication stage, a dielectric layer 38 may be formed over the waveguide core 12, fill features 28, and reference markers 30, 32. The dielectric layer 38 may be comprised of a dielectric material, such as silicon dioxide, having a refractive index that is less than the refractive index of the material constituting the waveguide core 12. The dielectric layer 38 may be deposited and planarized following deposition. In an embodiment, the dielectric material of the dielectric layer 38 may fill the space inside the reference markers 30, 32.

A back-end-of-line stack 42 including a stack of interlayer dielectric layers is formed over the dielectric layer 38. Each interlayer dielectric layer of the back-end-of-line stack 42 may be comprised of a dielectric material, such as silicon dioxide, silicon nitride, tetraethylorthosilicate silicon dioxide, or fluorinated-tetraethylorthosilicate silicon dioxide.

A portion of the back-end-of-line stack 42 proximate to the edge coupler 26 is removed, and a cavity 46 is defined in the semiconductor substrate 16. A portion of the cavity 46 extends as an undercut region 47 beneath the dielectric layer 14 such that a portion of the edge coupler 26 is suspended over the undercut region 47. A portion of the dielectric layer 14 defines a membrane between the suspended portion of the edge coupler 26 and the undercut region 47. Another portion of the cavity 46 is positioned adjacent to an edge 40 of the dielectric layer 14 that is defined at the transition to the undercut region 47. In an embodiment, the non-undercut portion of the cavity 46 may have an open end spaced from the edge coupler 26 to define a groove. In an alternative embodiment, additional cavities similar or identical to the cavity 46 may be arranged adjacent to the cavity 46, and each additional cavity may be associated with an edge coupler similar or identical to the edge coupler 26.

The cavity 46 may be formed by a multiple-step process. Lithography and etching processes may be used to form a rectangular opening that extends through the back-end-of-line stack 42 and into the semiconductor substrate 16, and to also form holes (not shown) extending through the dielectric layers of the back-end-of-line stack 42, the dielectric layer 38, and the dielectric layer 14 into the semiconductor substrate 16 on opposite sides of the edge coupler 26. The formation of the rectangular opening defines the edge 40 of the dielectric layer 14. The rectangular opening in the semiconductor substrate 16 may then be masked with a resist, and the semiconductor substrate 16 beneath a portion of the edge coupler 26 may be etched through the holes by an etching process using, for example, a sulfur hexafluoride plasma to provide an undercut. After removing the resist, a wet chemical etchant may be used to provide the cavity 46 with a V-shape or U-shape. The wet chemical etchant may exhibit selectivity with respect to crystal orientation of the semiconductor material of the semiconductor substrate 16 and may be characterized by different etching rates along different crystalline directions, which produces the V-shape or U-shape. For example, the wet chemical etchant may be a solution containing tetramethylammonium hydroxide.

The cavity 46 may include a bottom 54 at a maximum depth in the semiconductor substrate 16 and opposite sidewalls 50, 52 that are inclined relative to the bottom 54 of the cavity 46. The sidewalls 50, 52 are positioned at the periphery of the cavity 46 and are angled relative to the bottom 54 of the cavity 46. The sidewalls 50, 52 and bottom 54 extend in a lateral direction into the undercut region 47 of the cavity 46. The sidewall 50 adjoins the dielectric layer 14 inside the undercut region 47 along an edge 51 defining a corner at the interface 15 between the dielectric layer 14 and the semiconductor substrate 16. The sidewall 52 adjoins the dielectric layer 14 inside the undercut region 47 along an edge 53 defining a corner at the interface 15 between the dielectric layer 14 and the semiconductor substrate 16. The sidewalls 50, 52 are inclined at respective angles relative to the interface 15. The cavity 46 may have a width dimension W between the sidewall 50 and the sidewall 52. The width dimension W of the cavity 46 may vary over the portion of the undercut region 47 adjacent to the edge 40.

A dielectric layer 44 may be formed in the space over the edge coupler 26 formerly occupied by the removed portion of back-end-of-line stack 42. The dielectric layer 44 may be comprised of a homogeneous dielectric material, such as silicon dioxide, that is deposited by chemical vapor deposition and planarized by chemical mechanical polishing. The back-end-of-line stack 42 and the dielectric layer 44 converge along an interface 43 at which a transition occurs from the interlayer dielectric layers of the back-end-of-line stack 42 to the dielectric layer 44.

The reference marker 30 may overlap with a portion of the undercut region 47 of the cavity 46 at the sidewall 50. In an embodiment, the reference marker 30 may overlap with a portion of the edge 51 of the cavity 46 defined by the sidewall 50. In an embodiment, the reference marker 32 may overlap with a portion of the undercut region 47 of the cavity 46 at the sidewall 52. In an embodiment, the reference marker 30 may overlap with a portion of the edge 40 of the dielectric layer 14. In an embodiment, the reference marker 30 may overlap with a portion of the edge 51 of the cavity 46 at the sidewall 50, and the reference marker 30 may overlap with a portion of the edge 40 of the dielectric layer 14.

The reference marker 32 may overlap with a portion of the undercut region 47 of the cavity 46 at the sidewall 52. In an embodiment, the reference marker 32 may overlap with a portion of the edge 53 of the cavity 46 defined by the sidewall 52. In an embodiment, the reference marker 32 may overlap with a portion of the edge 40 of the dielectric layer 14. In an embodiment, the reference marker 32 with a portion of the edge 53 of the cavity 46 at the sidewall 52, and the reference marker 32 may overlap with a portion of the edge 40 of the dielectric layer 14.

In an embodiment, the dielectric material of the dielectric layer 14 is positioned between at least a portion of the reference marker 30 and the sidewall 50 of the cavity 46, and the dielectric material of the dielectric layer 14 is positioned between at least a portion of the reference marker 32 and the sidewall 52 of the cavity 46. In an embodiment, the reference markers 30, 32 may overlap with respective portions of the cavity 46 in the undercut region 47. In an embodiment, the reference markers 30, 32 may overlap with respective portions of the cavity 46 in the undercut region 47 and respective portions of the edge 40 of the dielectric layer 14. In an embodiment, the reference markers 30, 32 may overlap with respective portions of the cavity 46 at the opposite ends of the edge 40 of the dielectric layer 14.

In an embodiment, the reference markers 30, 32 may be at least partially surrounded by the fill features 28 after the cavity 46 is formed. The perimeter 34 of the reference marker 30 surrounds a surface area of the dielectric layer 14 that overlaps with a portion of the sidewall 50 of the cavity 46. In an embodiment, the portion of the sidewall 50 overlapped by the reference marker 30 is positioned in the undercut region 47 of the cavity 46. The perimeter 34 of the reference marker 32 surrounds a surface area of the dielectric layer 14 that overlaps with a portion of the sidewall 52 of the cavity 46. In an embodiment, the portion of the sidewall 52 overlapped by the reference marker 32 is positioned in the undercut region 47 of the cavity 46 that is beneath the dielectric layer 14.

The fill features 28, which are absent inside the reference markers 30, 32, do not obstruct optical paths through the dielectric layers 14, 44 to the opposite sidewalls 50, 52 of the cavity 46 in the undercut region 47. As a result, a metrology tool may be utilized to measure one or more dimensions of the cavity 46 absent interference from the fill features 28. For example, the reference markers 30, 32 may provide features having optical contrast in an image taken by the optics of a metrology tool that permits the edges 51, 53 of the cavity 46 to be distinguished in the image for a measurement of a dimension (e.g., a width dimension) between the edge 51 and the edge 53. As another example, the reference markers 30, 32 may provide features having optical contrast in an image taken by the optics of a metrology tool that permits the edge 51 of the cavity 46 to be distinguished in the image for a measurement of a dimension (e.g., a width dimension) between the edge 51 and the middle of the cavity 46 and/or between the edge 53 of the cavity 46 to be distinguished in the image for a measurement of a dimension between the edge 51 and the middle of the cavity 46.

Figure 5:
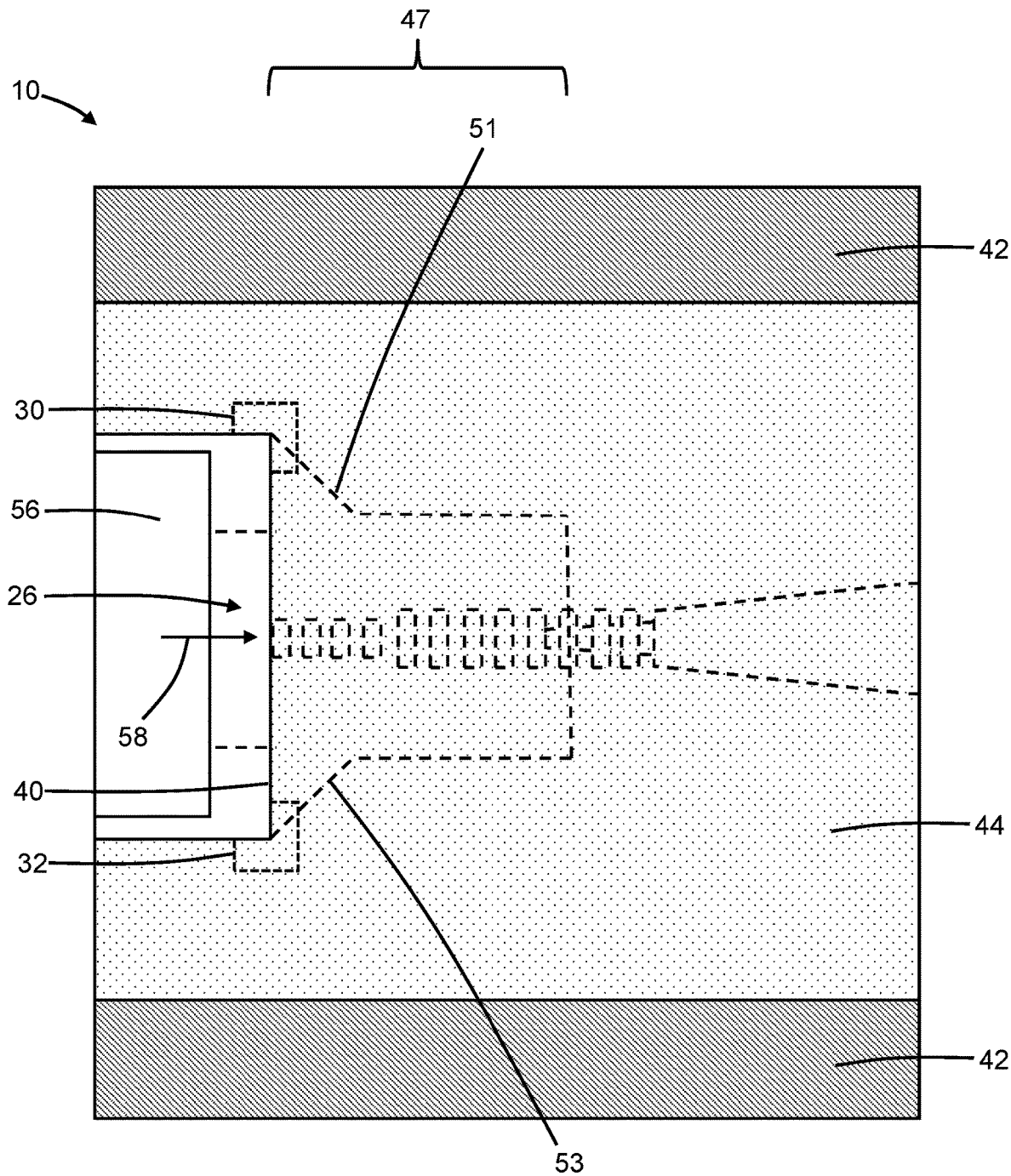
FIG. 5 is a top view of the structure at a fabrication stage of the processing method subsequent to FIGS. 3, 4.

With reference to FIG. 5 in which like reference numerals refer to like features in FIGS. 3, 4 and at a subsequent fabrication stage, a light source 56 may be positioned in the cavity 46 adjacent to the edge coupler 26. The light source 56 may be configured to provide light (e.g., laser light) in a mode propagation direction 58 toward the edge coupler 26. The edge coupler 26 may be configured for coupling light from the light source 56 to optical components on the photonics chip. The light may be characterized by a given wavelength, intensity, mode shape, and mode size, and the edge coupler 26 may provide spot-size conversion for the light. The space between the edge coupler 26 and the light source 56 may be filled by air or by an index-matching material, such as an optical adhesive. In an embodiment, the light source 56 may be a single-mode optical fiber having a tip that is positioned inside the cavity 46 adjacent to the edge coupler 26. In an alternative embodiment, the light source 56 may be a semiconductor laser chip positioned adjacent to the edge coupler 26, and the semiconductor laser chip may be attached inside the cavity 46. In an alternative embodiment, the light source 56 may be a semiconductor optical amplifier positioned adjacent to the edge coupler 26.

Figure 6:
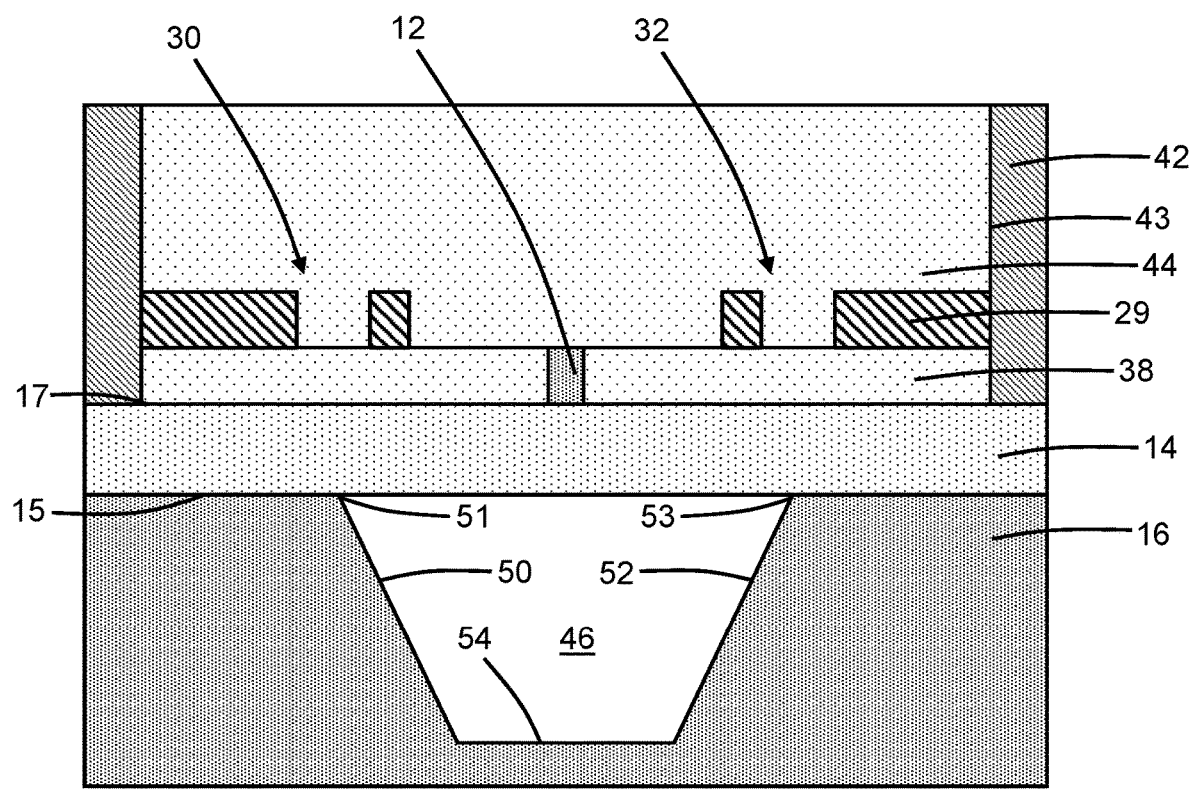
FIG. 6 is a cross-sectional view of a structure in accordance with alternative embodiments of the invention.

With reference to FIG. 6 and in accordance with alternative embodiments, the fill region 29 including the fill features 28 and reference markers 30, 32 may be positioned on the dielectric layer 38 and above the waveguide core 12 in a different level of the structure 10. In this instance, the fill features 28 and reference markers 30, 32 may be formed by middle-of-line processing, instead of front-end-of-line processing. In an embodiment, the fill features 28 may be comprised of a different material from the waveguide core 12.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
   a semiconductor substrate including a cavity with a first sidewall;
   a first dielectric layer on the semiconductor substrate;
   an edge coupler on the first dielectric layer;
   a fill region including a plurality of fill features adjacent to the edge coupler, the fill region including a first reference marker partially surrounded by the plurality of fill features, the first reference marker having a perimeter that surrounds a first surface area of the first dielectric layer, and the first surface area overlapping with a portion of the first sidewall of the cavity;
   a back-end-of-line stack including a stack of interlayer dielectric layers over the first dielectric layer; and
   a second dielectric layer over the edge coupler, the second dielectric layer converging with the back-end-of-line stack along an interface.

2. The structure of claim 1 wherein the plurality of fill features are absent inside the perimeter of the first reference marker.

3. The structure of claim 1 wherein the first sidewall adjoins the first dielectric layer along an edge, and the perimeter of the first reference marker overlaps with a portion of the edge.

4. The structure of claim 1 wherein the first dielectric layer includes a first edge adjacent to the edge coupler, the cavity includes an undercut region that extends in the semiconductor substrate from the first edge of the first dielectric layer beneath the edge coupler, and the perimeter of the first reference marker overlaps with a portion of the first edge in the undercut region.

5. The structure of claim 4 wherein the first sidewall of the cavity adjoins the first dielectric layer along a second edge, and the perimeter of the first reference marker overlaps with a portion of the second edge.

6. The structure of claim 1 wherein the edge coupler is directly positioned on the first dielectric layer, and the fill region is directly positioned on the first dielectric layer.

7. The structure of claim 6 wherein the plurality of fill features and the edge coupler comprise the same material.

8. The structure of claim 1 further comprising:
   a third dielectric layer on the first dielectric layer,
   wherein the edge coupler is embedded in the third dielectric layer, the third dielectric layer is positioned between the first dielectric layer and the second dielectric layer, and the fill region is positioned on the second dielectric layer.

9. The structure of claim 8 wherein the plurality of fill features comprise a first material, and the edge coupler comprises a second material different from the first material.

10. The structure of claim 1 wherein the cavity has a second sidewall, the fill region includes a second reference marker partially surrounded by the plurality of fill features, the second reference marker has a perimeter that surrounds a second surface area of the first dielectric layer, and the second surface area overlaps with the second sidewall of the cavity.

11. The structure of claim 10 wherein the plurality of fill features are absent inside the perimeter of the first reference marker, and the plurality of fill features are absent inside the perimeter of the second reference marker.

12. The structure of claim 10 wherein the cavity includes an undercut region that extends beneath the first dielectric layer, the first dielectric layer includes an edge adjacent to the edge coupler, and the first reference marker is spaced along the edge from the second reference marker.

13. The structure of claim 10 wherein the first sidewall of the cavity adjoins the first dielectric layer along a first edge, the perimeter of the first reference marker overlaps with a portion of the first edge, the second sidewall of the cavity adjoins the first dielectric layer along a second edge, and the perimeter of the second reference marker overlaps with a portion of the second edge.

14. The structure of claim 13 wherein the cavity has a width dimension that extends from the first edge to the second edge.

15. The structure of claim 10 wherein the cavity includes a trench bottom that connects the first sidewall to the second sidewall, and the trench bottom is positioned between the first reference marker and the second reference marker.

16. The structure of claim 1 further comprising:
a light source positioned in the cavity adjacent to the edge coupler, the light source having a light output configured to provide light in a mode propagation direction toward the edge coupler.

17. The structure of claim 16 wherein the cavity is a groove having an open end, and the light source is an optical fiber.

18. The structure of claim 1 further comprising:
a third dielectric layer on the first dielectric layer,
wherein the third dielectric layer comprises a dielectric material, the third dielectric layer is positioned between the first dielectric layer and the second dielectric layer, and the dielectric material of the third dielectric layer is positioned on the first surface area of the first dielectric layer inside the perimeter of the first reference marker.

19. The structure of claim 1 wherein the edge coupler includes a waveguide core, and the first reference marker is positioned adjacent to a portion of the waveguide core.

20. A method comprising:
forming a cavity in a semiconductor substrate, wherein the cavity includes a sidewall, and a first dielectric layer is positioned on the semiconductor substrate;
forming an edge coupler on the first dielectric layer;
forming a fill region including a plurality of fill features adjacent to the edge coupler and the cavity, wherein the fill region includes a reference marker partially surrounded by the plurality of fill features, the reference marker has a perimeter that surrounds a surface area of the first dielectric layer, and the surface area overlaps with a portion of the sidewall of the cavity;
forming a back-end-of-line stack including a stack of interlayer dielectric layers over the first dielectric layer;
removing a portion of the back-end-of-line stack from over the edge coupler; and
forming a second dielectric layer over the edge coupler to replace the portion of the back-end-of-line stack, wherein the second dielectric layer and the back-end-of-line stack converge along an interface.

* * * * *